(12) United States Patent
De Jonge

(10) Patent No.: US 7,663,068 B2
(45) Date of Patent: Feb. 16, 2010

(54) SWITCH DOME DEVICE

(75) Inventor: Johannes De Jonge, Södra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 416 days.

(21) Appl. No.: 10/561,688

(22) PCT Filed: Jun. 15, 2004

(86) PCT No.: PCT/EP2004/006405

§ 371 (c)(1),
(2), (4) Date: May 9, 2006

(87) PCT Pub. No.: WO2005/001866

PCT Pub. Date: Jan. 6, 2005

(65) Prior Publication Data

US 2006/0278503 A1 Dec. 14, 2006

Related U.S. Application Data

(60) Provisional application No. 60/485,525, filed on Jul. 7, 2003.

(30) Foreign Application Priority Data

Jun. 26, 2003 (EP) .................................. 03014353

(51) Int. Cl.
*H01H 9/26* (2006.01)

(52) U.S. Cl. ....................................... 200/5 R; 200/512

(58) Field of Classification Search ................. 200/5 R, 200/6 R, 6 A, 5 A, 17 R, 18, 4, 339–341, 200/512–520
See application file for complete search history.

(56) References Cited

U.S. PATENT DOCUMENTS

| 3,005,055 A | 10/1961 | Mattke |
| 4,486,629 A | 12/1984 | Sledesky .................... 200/6 A |
| 4,687,200 A | 8/1987 | Shirai .................... 273/148 B |
| 5,283,401 A | 2/1994 | Schmucker ................. 200/6 A |
| 6,441,753 B1 | 8/2002 | Montgomery ................ 341/34 |
| 6,570,107 B1 | 5/2003 | Nishimoto et al. .......... 200/6 R |
| 6,781,076 B2 * | 8/2004 | Takiguchi et al. ........... 200/316 |
| 2002/0070918 A1 | 6/2002 | Grivas et al. ................ 345/161 |
| 2003/0159910 A1 * | 8/2003 | Caldwell .................... 200/310 |

FOREIGN PATENT DOCUMENTS

| EP | 0750274 A2 | 12/1996 |
| EP | 0986022 A2 | 3/2000 |
| EP | 1239503 A2 | 9/2002 |

* cited by examiner

*Primary Examiner*—Elvin G Enad
*Assistant Examiner*—Lisa N Klaus
(74) *Attorney, Agent, or Firm*—Myers Bigel Sibley & Sajovec, P.A.

(57) ABSTRACT

A switch dome device for operating functions in electronic equipment includes a plurality of switch domes mounted in a circular pattern on a support structure. Outputs of adjacent switch domes are operatively connected to inputs of a common AND circuit.

9 Claims, 5 Drawing Sheets

SWITCH DOME DEVICE

RELATED APPLICATIONS

The present application is a 35 U.S.C. §371 national phase application of PCT International Application No. PCT/EP2004/006405, having an international filing date of Jun. 14, 2004, and claiming priority to European Patent Application No. 03014353.1, filed Jun. 26, 2003 and U.S. Provisional Patent Application No. 60/485,525, filed Jul. 7, 2003, the disclosures of which are incorporated herein by reference in their entireties. The above PCT International Application was published in the English language and has International Publication No. WO 2005/001866 Al.

TECHNICAL FIELD OF THE INVENTION

The present invention relates to a switch dome device for operating functions in an electronic equipment.

DESCRIPTION OF RELATED ART

To meet the increased demand from mobile phone and smart phone users or the like for more advanced functions, vendors offer mobile phones with more advanced input/output devices such as larger displays, joysticks and rocker keys to operate for example extensive entertainment functions. State of the art miniature joysticks and rocker keys offer, however, a limited number of activation directions, not sufficient for playing games or executing other graphic intensive functions.

A prior art rocker key device 1 is shown in a schematic exploded top view in FIG. 2A. The rocker key device has a rocker key 2, a select button 3, switch domes 4, all of which are mounted on a support structure 5, such as a PCB, for arrangement in for example a mobile phone. With further reference to FIG. 2B, an exploded bottom view of the rocker key device 1 in FIG. 2A is illustrated. The rocker key 2 is provided with actuator bosses 6 integrated in the rocker key 2 or in a supporting rubber for actuating the switch domes 4, when the rocker key 2 is pushed by a user.

FIG. 3A illustrates an arrangement of the switch domes 4 in a four directional arrangement forming a part of a rocker key device. The actuating directions are illustrated by the arrows 7. As mentioned above, new functions and applications require more actuating directions to be operated properly.

One prior art arrangement to provide eight selectable directions is extended from the four directional arrangement shown in FIG. 3A. Four switch domes 4 are used, wherein one single switch dome is actuated for each of the four directions, i.e 0/90/180/270°, as shown in FIG. 3A, and four additional directions 45/135/225/315°, as shown by the arrows 7 in FIG. 3B. The positions of the switch domes 4 and the directions are related to the vertical orientation of the drawing sheets, which corresponds to the normal operation of a mobile phone provided with a rocker key device.

A problem associated with this design is that the user has to press two domes at the same time for the four additional directions 45/135/225/315°, which is almost impossible. There will be a time interval were only one dome is pressed, causing an initial unwanted selection of one of the first four directions 0/90/180/270°. This problem might be overcome by a software delay, long enough to secure that only the intended direction is properly selected. Since the response time has to match the slowest user, the phone appears slow for most users which is annoying. This is particularly noticeable when playing games on the phone.

Another problem with this arrangement is that the tilting angle and the actuation force of the joystick or rocker key is not the same for the 0/90/180/270° directions and the 45/135/225/315° directions.

Another prior art arrangement providing eight selectable directions is based on eight switch domes positioned on 0/45/90/135/180/225/270/315°, as shown in FIG. 4A. Similarly to the four switch dome arrangement, a single switch dome is actuated at a time to select one of the eight directions.

A side view of a rocker key device 1 comprising eight switch domes is shown in FIG. 4B. The distance from the actuator boss 6 of adjacent domes to the centre 8' of rotation is about 70% of the distance from the boss of the targeted dome to the centre 8' of rotation. The same ratio applies for the vertical stroke. Hence, there is a potential risk that one of the domes adjacent to the intended dome is accidentally pressed. Without being precautious, this would result in an incorrect selection of two directions simultaneously. This can be compensated for by software that make the phone ignoring the input of more than one pressed dome at the same time. These cases will confuse and irritate the user of the phone. Intuitively, the user will press the key harder, but still without response from the phone. Even if the adjacent domes are not closing contact, the actuator, i.e the key and boss, will at least partially compress them. This will lead to a poor tactile feedback for the user.

SUMMARY OF THE INVENTION

It is an object of the invention to overcome the problems of the prior art arrangements.

This object is achieved by a switch dome device for operating functions in an electronic equipment, wherein the device comprises a set of switch domes mounted in a circular pattern on a support structure. The switch dome device is characterized in that outputs of adjacent switch domes are operatively connected to inputs of a common AND circuit.

According to one aspect of the invention the switch domes are equally distributed around the circular pattern with the same distance to the centre of the circular pattern.

According to a more specific aspect of the invention the set of switch domes comprises eight switch domes.

A more specific object of the invention is to provide an improved input device for operating functions in an electronic equipment.

This object is achieved by an input device, comprising a switch dome device according to the invention and a switch dome actuator for actuating switch domes of the switch dome device.

According to one aspect of the input device, the actuator is a rocker key provided with actuator bosses for actuating the switch domes.

Another object of the invention is to use the inventive switch dome in a communication equipment for improved operation of for example applications and functions in the equipment.

This object is achieved by using the inventive input device in a portable communication equipment. The portable communication equipment may be a mobile radio terminal.

One advantage of the present invention is that a software response delay associated with the switch dome activation is unnecessary. Also, the tilt angle and actuation forces are identical for all directions, and the tactile feedback is better.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF EMBODIMENTS

Figure 1:
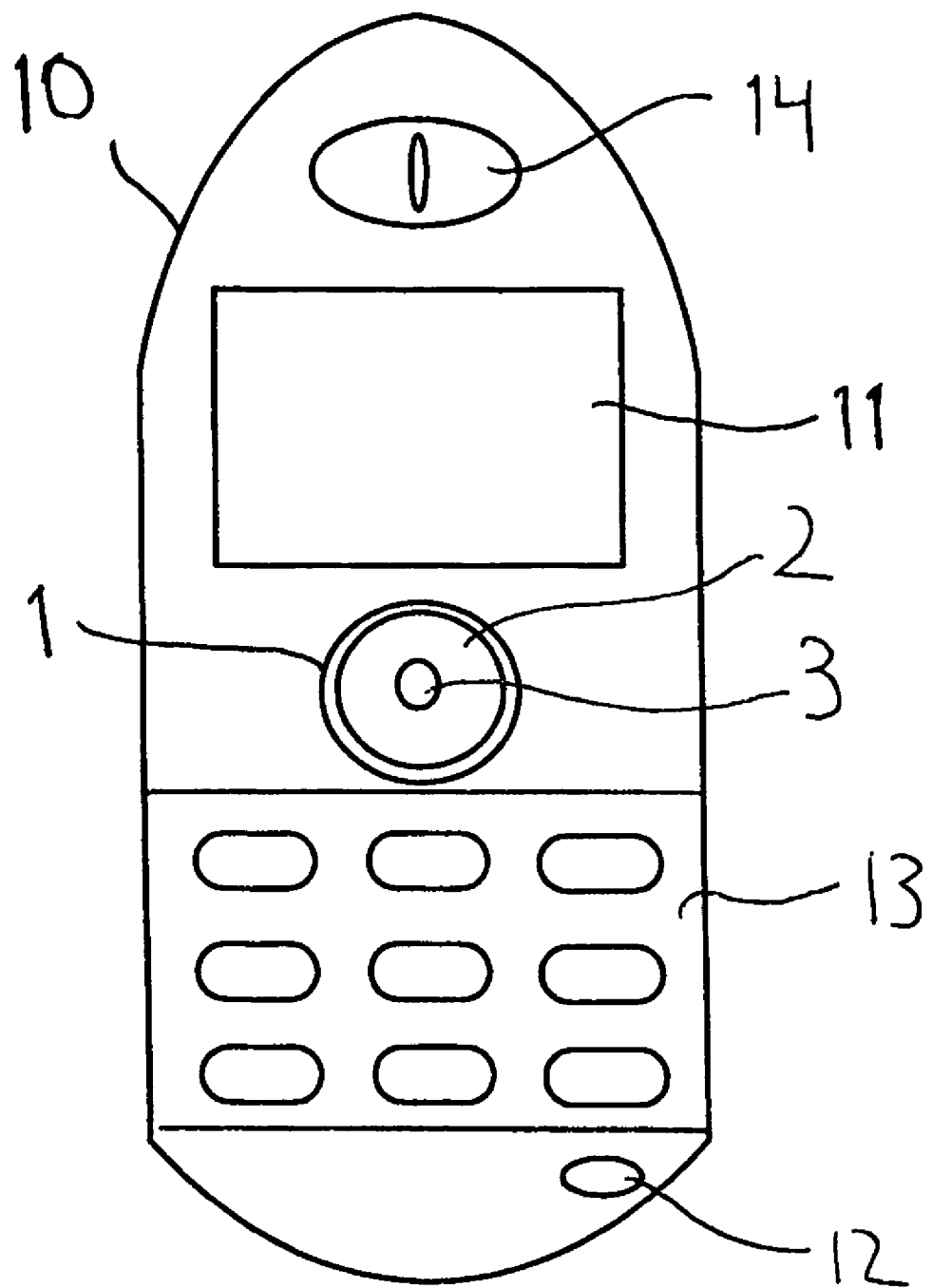
FIG. 1 shows a mobile radio terminal including an input device according to the invention.

A first embodiment of an input device 1 to operate different applications such as playing games or executing other graphic intensive functions including extensive entertainment functions of an electronic equipment is shown in FIG. 1.

The term electronic equipment includes portable radio communication equipment. The term portable radio communication equipment, which herein after is referred to as a mobile radio terminal, includes all equipment such as mobile phones, pagers, communicators, i.e electronic organizers, smartphones or the like.

Further, in the following description, numerous specific details are provided in detail in order to give a more thorough description of the present invention. However, it will be obvious for those skilled in the art that the present invention may be implemented without these specific details. Some well-known features are not described in detail so as not to make the present invention unclear.

In this embodiment, the input device is, but is not limited to, a rocker key device 1 mounted in a mobile radio terminal 10 and operatively connected to circuits therein. The rocker key device 1 comprises a rocker key 2 and a select button 3 for selection or activation of different functions etc of the mobile radio terminal 10. The input device of the invention is however not limited by the select button 3, but can operate without it. Further, the mobile radio terminal has, but is not limited to, additional details intended for the normal operation of a mobile radio terminal. In this embodiment the mobile radio terminal has a display 11, a microphone 12, a keypad 13, a speaker 14, an integrated antenna (not shown), and a radio transceiver (not shown); etc, all of which are operatively connected to circuits in the mobile radio terminal. All these additional details are however not necessary for the operation of the invention, but are provided for illustration purposes of elements of a mobile radio terminal, in which the invention is used.

Figure 2A:
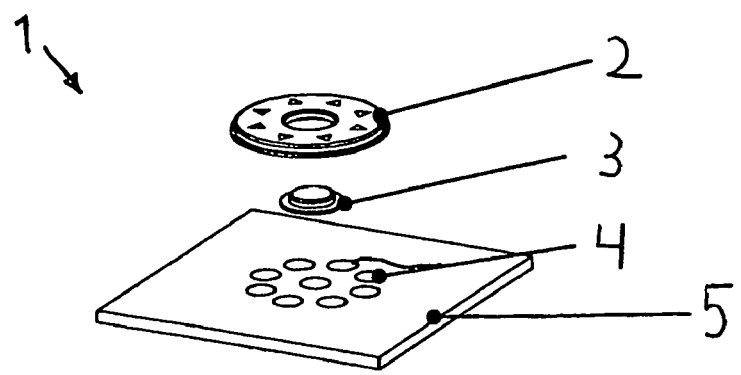
FIG. 2A is a schematic exploded top view of a prior art rocker key device.
Figure 2B:
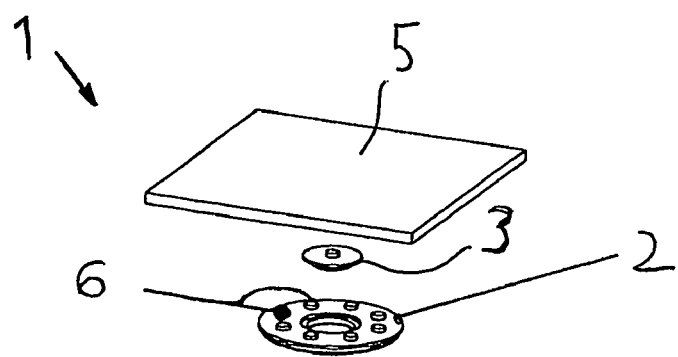
FIG. 2B is a schematic exploded bottom view of the rocker key device in FIG. 2A.
Figure 3A:
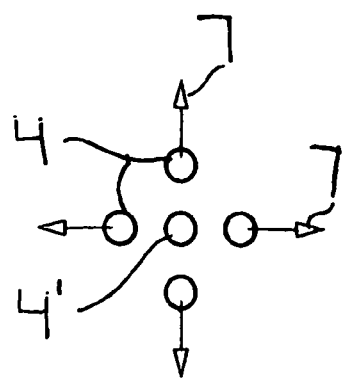
FIG. 3A illustrates a schematic top view of four switch domes arranged in four selectable directions of operation.
Figure 3B:
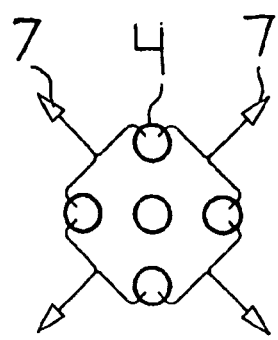
FIG. 3B illustrates a schematic arrangement of the switch domes in FIG. 3A with four additional directions of operation to be selected.
Figure 4A:
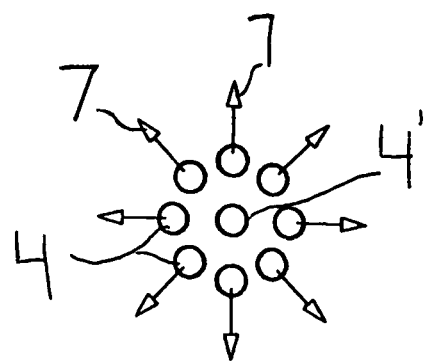
FIG. 4A illustrates a schematic arrangement of eight individually selectable switch domes providing eight selectable directions of operation.
Figure 4B:
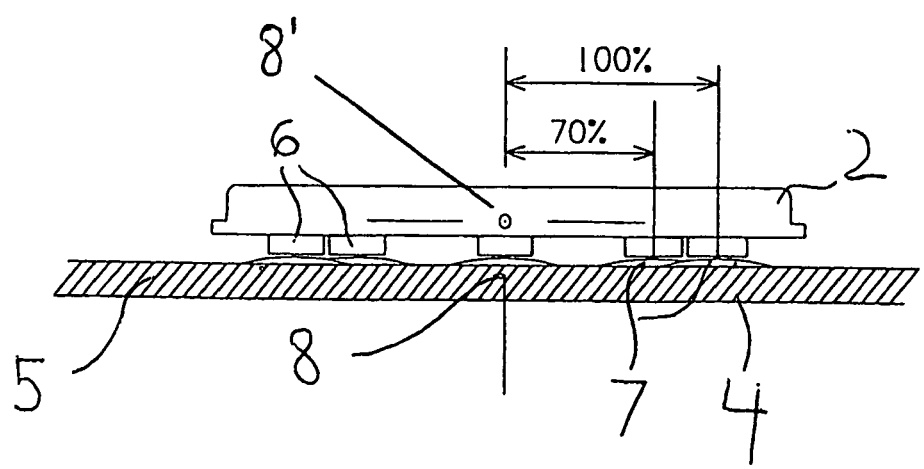
FIG. 4B shows a schematic side view of a rocker key device comprising the arrangement of FIG. 4A.

The rocker key device is shown in further detail in FIGS. 2A and 2B. The rocker key device 1 comprises the rocker key 2, the select button 3, switch domes 4, all of which are mounted in a support structure 5, such as a PCB, for arrangement in for example the mobile radio terminal 10 in FIG. 1. An exploded bottom view of the rocker key device 1 in FIG. 2A is illustrated in FIG. 2B. The rocker key 2 is provided with actuator bosses 6 integrated in the key 2 or in a supporting rubber for actuating the switch domes 4, when the rocker key is pushed by a user.

FIGS. 3A, 3B, 4A, and 4B disclose prior art arrangements.

Figure 5A:
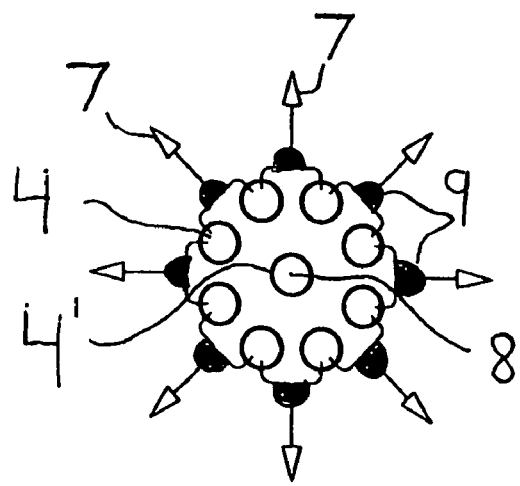
FIG. 5A illustrates a schematic arrangement of eight switch domes providing eight selectable directions of operation according to the invention.

FIG. 5A illustrates a schematic arrangement of a set of eight switch domes 4 forming a switch dome device providing eight selectable directions 7 of operation, according to the invention. The eight selectable directions are based on the eight switch domes 4, equally distributed around a circular pattern on the support structure 5, with the same distance to the centre 8 of the circular pattern. The switch domes are positioned on 22.5/67.5/112.5/157.5/202.5/247.5/292.5/337.5° around the circular pattern and with respect to the orientation of the display of the mobile radio terminal 10 held in a vertical position for normal operation by a user. The invention is however not limited to the given positions of the domes and directions of actuation, but they can be rotated with a maintained intermediate distance between the domes. The individual switch domes and their functionality are well known to the skilled person in the art and are not described in further detail herein.

Figure 5B:
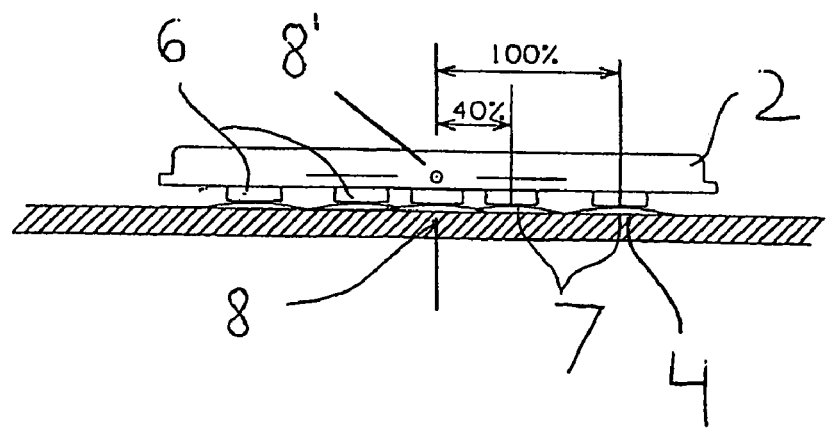
FIG. 5B shows a schematic side view of a rocker key device according to the invention comprising the arrangement of FIG. 5A.

According to the invention, outputs of adjacent switch domes 4 are operatively connected to inputs of a common AND-circuit 9, as schematically illustrated in FIG. 5A. The switch dome 4' may be positioned for actuation via a select button, for example. The AND-circuit 9 is preferably implemented as, but is not limited to, an AND-gate, the logical operation of which is well known. The output of the AND circuit 9 is connected to other circuits on the PCB of the mobile radio terminal. For example, when a user intends to move a cursor in a particular direction, or in another way control an application or game, on the display 11 of the mobile radio terminal, the user actuates the rocker key device 1. The rocker key 2 is pressed on a location, preferably near the circumference of the upper side of the rocker key 2, to actuate a pair of switch domes 4 in a particular direction of the eight selectable directions 7. Each of the pressed switch domes 4 generates an output signal. If the user actuates two switch domes, whose outputs are connected to inputs of the same AND-circuit 9, an output signal is generated from the AND-circuit 9. The output signal form the AND-circuit 9 is received by the circuits on the PCB for further control of the a cursor in a particular direction, or in another way control an application or game, on the display 11 of the mobile radio terminal. As is apparent from FIGS. 5A and 5B, the tilt angle and actuation forces are identical for all directions.

The distance from the actuator boss 6 of adjacent domes 4 to the centre of rotation 8' is about 40% of the distance from the boss 6 of the targeted dome 4 to the centre of rotation 8'. The same ratio applies for the vertical stroke. Thus, the stroke of the actuator on the third dome is only 40% of that of the intended two domes to be pressed. Hence, the risk of accidentally hitting an adjacent third dome is very small. Even in case of a third dome being pressed, the "correct" domes will be pressed first and software in the phone can easily ignore the third contact.

Due to the AND-circuit 9, no response will be given if only one dome 4 is pressed. The intuitive user reaction of pressing a little harder will give the desired result. Further, the tactile feedback is better because the adjacent domes are hardly touched.

Hence, the present invention provides an input device and switch dome device for operating functions in an electronic equipment. However, the present disclosure of the embodiment described is to be considered as exemplification of the invention and it is not intended to limit the invention to the specific embodiment.

For example, in an alternative embodiment of the invention the input device is a joystick. In this alternative embodiment the domes are fitted in a plastic support structure, making contact with inmolded leads which also from the terminals of the component with which it is mounted on the PCB. The number of switch domes can also vary between alternative embodiments, preferably eight or more are used. However, for less complex applications fewer than eight domes might be used.

The invention claimed is:

1. A switch dome device for operating functions in electronic equipment, the device comprising:
    a support structure;
    a plurality of switch domes mounted in a circular pattern on the support structure; and
    an AND circuit;
    wherein outputs of adjacent switch domes are connected to inputs of the AND circuit and the switch dome device is responsive to only two adjacent ones of the plurality of switch domes actuated at a time for operating a function.

2. A switch dome device according to claim 1, wherein the switch domes are about equally distributed around the circular pattern with about the same distance to the centre of the circular pattern.

3. A switch dome device according to claim 1, wherein the plurality of switch domes comprises eight switch domes.

4. An input device for operating functions in electronic equipment, comprising:
    a support structure;
    a plurality of switch domes mounted in a circular pattern on the support structure;
    a switch dome actuator for actuating ones of the plurality of switch domes; and
    an AND circuit;
    wherein outputs of adjacent switch domes are connected to inputs of the AND circuit and the switch dome device is responsive to only two adjacent ones of the plurality of switch domes actuated at a time for operating a function.

5. An input device according to claim 4, wherein the actuator is a rocker key provided with actuator bosses for actuating switch domes.

6. An input device according to claim 4, wherein the actuator is a joystick.

7. Electronic equipment, comprising:
    an input device for operating functions of the electronic equipment, comprising:
        a support structure;
        a plurality of switch domes mounted in a circular pattern on the support structure;
        a switch dome actuator for actuating ones of the plurality of switch domes; and
        an AND circuit;
        wherein outputs of adjacent switch domes are connected to inputs of the AND circuit and the switch dome device is responsive to only two adjacent ones of the plurality of switch domes actuated at a time for operating a function.

8. Electronic equipment according to claim 7, further comprising:
    a display;
    wherein the switch domes are positioned on the support structure on 22,5/67,5/112,5/157,5/202,5/247,5/292,5/337,5° positions around the circular pattern with respect to the orientation of the display held in a position for normal operation by a user.

9. Electronic equipment according to claim 7, wherein the electronic equipment is a mobile radio terminal.

* * * * *